Figure 1:
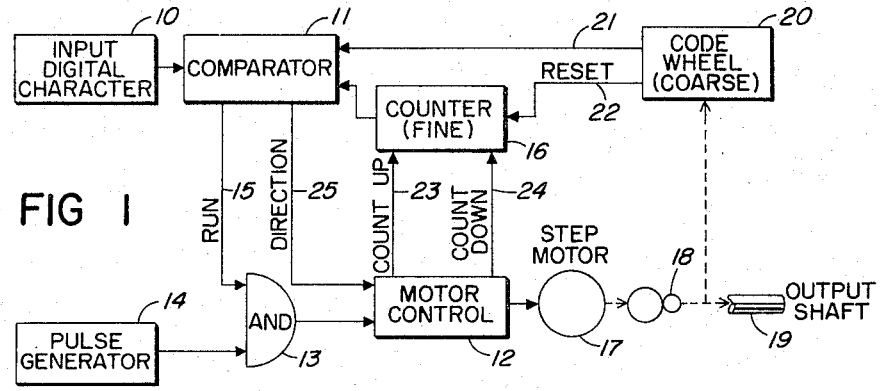

Feb. 20, 1968  W. T. HEDGCOCK ET AL  3,370,289

DIGITAL-TO-ANALOG CONVERTER SYSTEM

Filed Feb. 26, 1965  2 Sheets-Sheet 1

INVENTORS
WENDELL T. HEDGCOCK
CHARLES E. KRESS
BY
*Moody and Phillion*
ATTORNEYS

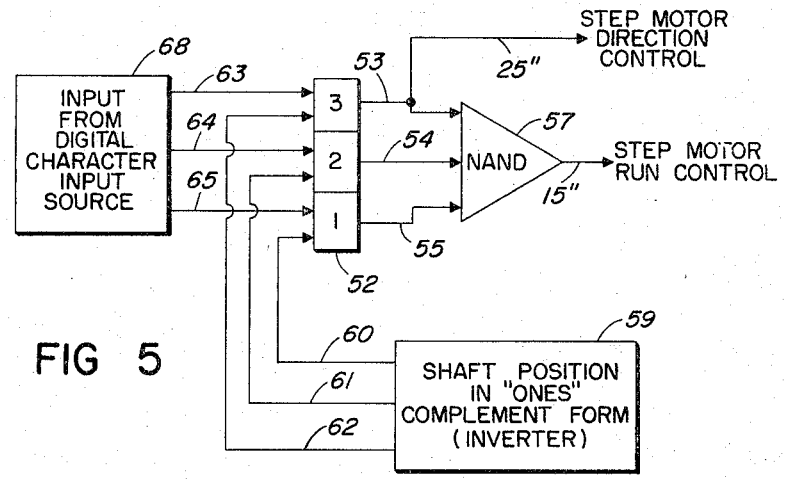

FIG 5

CASE 1 – POSITIVE DIFFERENCE – ABSOLUTE VALUE $< \frac{2^N}{2} = (4) -$ CLOCKWISE ROTATION

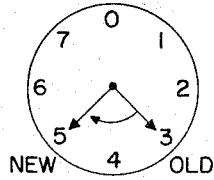

```
NEW POSITION      101
OLD POSITION      100  (I'S COMPLEMENT)
                  ‾‾‾
                  001
END AROUND CARRY    1
SUBTRACTOR OUTPUT 011
```
FIG 6a

CASE 2 – NEGATIVE DIFFERENCE – ABSOLUTE VALUE $<4$ – COUNTER CLOCKWISE ROTATION

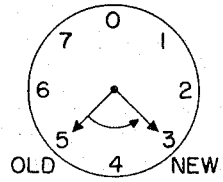

```
NEW POSITION      011
OLD POSITION      010  (I'S COMPLEMENT)
                  ‾‾‾
                  101
END AROUND CARRY    0
SUBTRACTOR OUTPUT 101
```
FIG 6b

CASE 3 – POSITIVE DIFFERENCE – ABSOLUTE VALUE $>4$ – COUNTER CLOCKWISE ROTATION

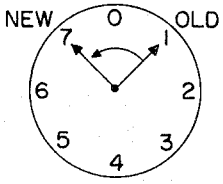

```
NEW POSITION      111
OLD POSITION      110  (I'S COMPLEMENT)
                  ‾‾‾
                  101
END AROUND CARRY    1
SUBTRACTOR OUTPUT 110
```
FIG 6c

CASE 4 – POSITIVE DIFFERENCE – ABSOLUTE VALUE $>4$ – CLOCKWISE ROTATION

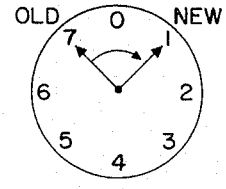

```
NEW POSITION      001
OLD POSITION      000  (I'S COMPLEMENT)
                  ‾‾‾
                  001
END AROUND CARRY  000
SUBTRACTOR OUTPUT 001
```
FIG 6d

INVENTORS
WENDELL T. HEDGCOCK
CHARLES E. KRESS
BY
*Moody and Phillion*
ATTORNEYS

# United States Patent Office 3,370,289
Patented Feb. 20, 1968

3,370,289
DIGITAL-TO-ANALOG CONVERTER SYSTEM
Wendell T. Hedgcock, Cedar Rapids, and Charles E. Kress, Marion, Iowa, assignors to Collins Radio Company, Cedar Rapids, Iowa, a corporation of Iowa
Filed Feb. 26, 1965, Ser. No. 435,520
12 Claims. (Cl. 340—347)

This invention relates generally to digital-to-analog conversion systems and, more particularly, to a digital-to-analog conversion system employing, in combination, a code wheel and a counter.

There are many applications or needs for a structure which will convert digital information into analog information. In the prior art two basic schemes have been used to perform such digital-to-analog conversion. One of these schemes employs a comparator, a counter, and a motor, and some means to indicate small, discrete, angular motions of the shaft of the motor. As the motor is rotated, the counter counts forwards or backwards to count the small, discrete, angular displacements of the motor until the number contained in the counter is equal to the digital information which is to be changed to analog information. A comparator compares the received digital information with the digital information contained in the counter and when coincidence occurs, the servomotor is caused to stop, thus positioning the shaft in some precise angular location.

Another common expedient for transforming digital information into analog information involves the use of a comparator, a servomotor, and a code wheel. The code wheel is driven by the motor shaft, usually through some kind of a gear reduction means. The comparator again compares the received digital information supplied from the code wheel. The code wheel will rotate until it assumes an angular position such that the digital information contained therein coincides with the received digital information. At this time the motor is caused to stop and the transformation from digital-to-analog information is completed.

The use of a counter in the first of the two systems described above has the disadvantage that an error in the counter can occur and such error will persist until the shaft of the servomotor passes through some predetermined zero reference. When such shaft does pass through such a zero reference, the counter can be reset to zero to removed any error that has accumulated therein. However, in some applications the passage of the servomotor shaft through the zero reference might not occur for some time, during which time an error would exist in the counter and produced corresponding errors in the position of the servo motor shaft. A further disadvantage in a system employing a counter is that loss of power, in effect, disconnects the motor from the counter and it is necessary to zeroize the counter and the servo motor shaft immediately upon resumption of power. Such zeroizing requires a rotating of the shaft from whatever point it may have been operating, through the zero reference position, and then, of course, back to the point of operation existing before the power failure. Such an occurrence has serious consequences if the servomotor, for example, is connected to a control of an aircraft.

In the system employing a code wheel, the possibility of errors creeping into the system is less than those employing counters. However, code wheels have the disadvantage of being quite expensive. Further, code wheels are not capable of defining angular separations as small as can be defined with a counter.

An object of the present invention is to provide a digital-to-analog converter employing the combination of a counter and a code wheel to obtain the advantages of both and eliminate most of the disadvantages of both.

A further object of the invention is a reliable and relatively inexpensive digital-to-analog converter system.

A third object of the invention is the improvement of digital-to-analog converter systems, generally.

In accordance with the invention there is provided a servo stepping motor which drives a code wheel. The servo step motor is of the type which will step a given angular distance in response to each input pulse supplied to a motor control therefor. A counter is constructed to also respond to the pulses supplied to the servo step motor, through the motor control, to count the number of angular steps the motor has taken. The aforementioned code wheel constitutes a coarse adjustment and changes its output code every predetermined number of steps of the step motor. The counter is a fine control and counts individual steps of the step motor and thus acts as an interpolator between code wheel positions. Each time the code wheel assumes a new coarse position, the counter is reset.

Thus, if the shaft upon which the code wheel is mounted is to have 4,096 discrete angular positions, which would be equal to the binary number $2^{12}$, the code wheel could be designed to represent the six most significant binary digits, or 64 coarse positionings of the output shaft. The counter would then represent the six least significant binary digits and would indicate 64 discrete angular positions between each of any two adjacent coarse positions represented by the code wheel. The six most significant digits represented by the code wheel and the six least significant binary digits represented by the counter are supplied to a comparator which compares the resultant 12-bit binary code with a received binary code of 12 bits. When coincidence occurs between the two received binary codes, the motor control is disabled from the pulse source so that the step servomotor stops and the position of the shaft is thereby defined, in accordance with the received digital character.

In accordance with a feature of the invention, the use of the counter to represent the fine positions of the servo step motor provides a substantially reduced cost in a digital-to-analog conversion system, as compared to the cost of such a system if employing a relatively complex and precision-built code wheel.

In accordance with another feature of the invention, the use or the combination of the counter and the code wheel results in frequent automatic resetting of the counter, inasmuch as resetting of the counter occurs every time the code wheel passes through one of its 64 discrete angular positions. Thus, each time the code wheel moves through 5.6°, resetting of the counter occurs, to substantially eliminate accumulated errors.

Figure 2:
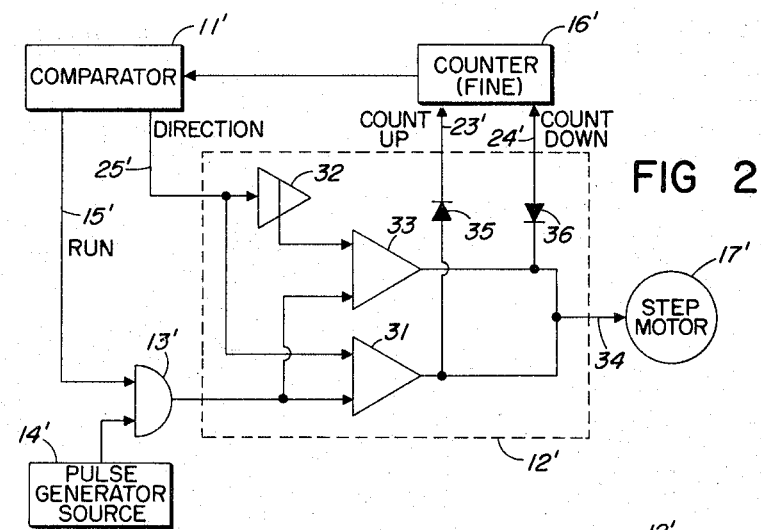
Figure 3:
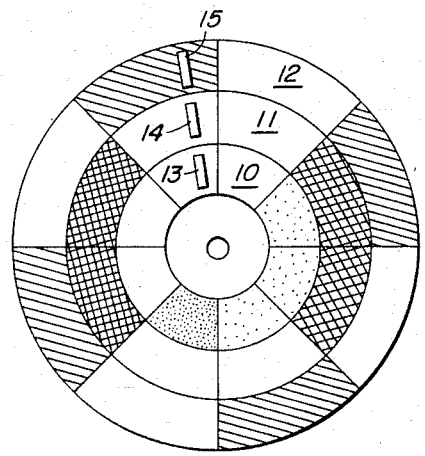
Figure 4:
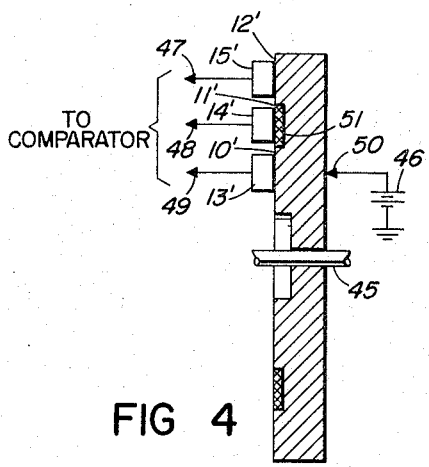

The above and other objects and features of the invention will be more fully understood from the following detailed description thereof when read in conjunction with the drawings, in which:

FIG. 1 is a block diagram of the invention;
FIG. 2 is a block diagram of the comparator;
FIG. 3 shows a code wheel;
FIG. 4 shows a side view of FIG. 3;
FIG. 5 shows a more detailed block diagram of the comparator employed to compare binary signals; and
FIGS. 6a, 6b, 6c, and 6d show examples of changing angular positions under different initial conditions.

Referring now to FIG. 1, a digital input character is supplied to comparator 11 from digital character source 10. Such digital characters represent, in binary form, the position to which the output shaft 19 is to be set. Output shaft 19 is driven by a step motor 17 through gear reduction means 18. In turn, the step motor 17 is driven by motor control 12 to which is supplied pulses from pulse generator 14. The step motor 17 is of the type which will rotate a discrete and predetermined angular distance each time the pulse is supplied to the motor control from pulse generator 14. Such step motors are well known in the art and will not be described in detail herein. The counter 16 and code wheel 20, which are connected respectively to outputs of motor control 12 and output shaft 19, each have a number of output leads connected to a second set of inputs to comparator 11. The output signals of counter 16 and code wheel 20 are also in code form (binary code) as is the digital input signal from source 10.

For purposes of discussion, assume that the input digital character is 12 bits in length, which represents a total binary number of 4,096. Assume, further, that the code wheel 20 has six output leads going to the comparator 11, which six output leads contain the six most significant binary digits representing the position of the output shaft 19. The counter 16 also has six output leads connecting to comparator 11; said six output leads containing the six least significant binary digits representing the position of output shaft 19.

Although counter 16 is driven directly from the output of motor control 12, it is apparent that said counter represents positions of the output shaft 19 since the step motor is driven by the motor control 12.

When the full capacity of the 12-bit binary code is utilized, output shaft 19 has 4,096 angular discrete positions in a given 360° rotation. Thus, the angular positions of shaft 19 will each describe an arc of 360 degrees divided by 4,096, which is equal to .088°, or 5.3 minutes.

Assume that step motor 17 is instructed to step 15° each time a pulse is supplied to the motor control 12 from pulse generator 14 through AND gate 13. With such 15° steps there will be 24 discrete steps in each 360° revolution of the motor shaft, i.e., with no gear reduction. Since the output shaft is to have 4,096 discrete angular positions, the gear reduction ratio of gear arrangement 18 is equal to 4,096 divided by 24, or 170.4.

In the operation of the device there is supplied from source 10 to the comparator, command input signals which do not correspond to the position of the output shaft 19; i.e., which do not correspond to the digital output of the counter 16 and the code wheel 20. Under such circumstances, an output signal will appear on lead 15 from comparator 11 which will prepare AND gate 13 to pass pulses from pulse generator 14. The pulse generator 14 can have a continuous output and is connected and disconnected to and from control 12 by the action of AND gate 13. When AND gate 13 is opened, the pulses from generator 14 will pass therethrough to motor control 12 and cause said motor to step once for each pulse supplied thereto. Each step of the motor 17 is, as discussed above, about 15°.

It is possible for step motor 17 to position output shaft 19 to a desired new position by always rotating in a given direction, for example, the clockwise direction. Under such circumstances, only AND gate 13 would be required. The counter 16 would always then count in a given direction, say from 0 to 64. However, such an arrangement would means that if the shaft 19 were in its position 4,093 and it were desired to position said shaft in its position 4,092, an entire revolution would be required to bring it to the new position. On the other hand, if the step motor could step both forwards and backwards, the shaft could be positioned in its new position by one step in the backward, or counterclockwise direction.

The embodiment of the invention shown in FIG. 1 provides for forward and backward stepping of step motor 17. Such backward or reverse stepping of the motor 17 is controlled by a signal on lead 25 which is supplied to motor control 12. Also supplied to motor control 12 is the output of pulse generator 13'. Motor control 12 is responsive to the signals supplied thereto to cause the counter 16 to count forwards or backwards in accordance with signals supplied thereto through leads 23 and 24.

As discussed above, the code wheel 20 determines the coarse positions of the output shaft, i.e., the discrete angular positions separated by an angular distance of 360 divided by 64, or 5.6°. The counter 16 divides each 5.625° segment into 64 segments of approximately 5.2 minutes each to provide a total of 4,096 positions for output shaft 19. Each time code wheel 20 passes through one of its 64 coarse positions, counter 16 will be reset by means of a signal on lead 22. Thus, any errors accumulating in counter 16 will be eliminated each time output shaft passes through one of the 64 positions determined by the code wheel 20.

Referring now to FIG. 2, there is shown a more detailed block diagram of the motor control. Other elements, such as the comparator 11', counter 16', pulse source generator 14', and AND gate 13' are also shown in FIG. 2.

Within block 12' there is shown a logic diagram of motor control 12 of FIG. 1, which comprises AND gates 31, 33, inverter 32, and diodes 35 and 36. When AND gate 13' is enabled to pass pulses from source 14, either of AND gates 31 and 33 will also be enabled in accordance with the signal on the direction indicating control lead 25'. If the signal on lead 25' is of one polarity, commanding rotation of the shaft in a clockwise direction, AND gate 31 will be energized and the pulses of a given polarity (positive polarity for purposes of discussion) are supplied to step motor 17' via lead 34.

If the signal appearing on the direction indicating lead 25' is of the other polarity, commanding rotation in a counterclockwise direction, such signal is inverted in inverter means 32 and supplied to AND gate 33 to open said AND gate 33 and pass pulses of a negative polarity to output lead 34 and thence to step motor 17'. The negative pulses will cause the step motor to advance in a counterclockwise direction.

When the signal appearing on lead 25' is of a polarity indicating counterclockwise rotation of the output shaft, gate 31 is closed by such signal, thus preventing the supplying of positive pulses from the output of AND gate 31'. Conversely, when the polarity of the signal appearing on the lead 25' calls for clockwise rotation of the shaft, the output of inverter 32 will be such as to close gate 33 to prevent pulses from passing therethrough.

The outputs of AND gates 31 and 33 are supplied via diodes 36 and 35, respectively, to counter 16'. Such diodes function to isolate the outputs of AND gates 31 and 33 from the leads 24' and 23', respectively. More specifically, the diodes 35 and 36 permit the output of AND gate 31 to pass only to the count up lead 23' and the output of AND gate 33 to pass only to the count down lead 24'.

The counter 16' is of the type which either count up or count down. Such counters are well known in the art and will not be described in detail herein.

Referring now to FIG. 3, there is shown a code wheel capable of generating a three-bit code. While in the embodiment of the invention shown in FIG. 1 the code wheel used therein is assumed to be capable of generating a six-bit binary code, a description of a code wheel capable of generating a three-bit code will be sufficient to enable the reader to understand the basic principles of a code wheel and apply them readily to the case of a six-bit generating code wheel.

In FIG. 3 the code wheel is composed of three concentric circular areas 10, 11, and 12. Each of the circular areas are divided into eight sectors of 45° each. The outer circular area 12 represents the least significant bit $2^0$ and, as can be seen, every other section thereof is crosshatched; the crosshatched areas representing conductive areas with which the brush 15 makes contact. The plain or uncrosshatched areas represent insulated areas.

The second circular area 11 represents the next significant bit $2^1$ with the crosshatched areas again representing conductive surfaces with which the brush 14 makes contact as the code wheel rotates. The inner circular area 10 represents the most significant bit $2^2$, with the dotted area representing the conductive area. Examination of the coded wheel will reveal that the configurations of the conductive areas of the three concentric circular areas are arranged to form eight different combinations of conductive areas, a different one for each of the eight sectors in which the disc is divided. For example, the particular sector upon which the brushes 13, 14, and 15 are shown represents the binary word "001," with the "1" being the least significant bit.

Referring now to FIG. 4, there is shown a side view of the disc of FIG. 3, showing more details of the wheel construction. Most of the wheel is of a conductive material, but the insulated sections thereof, such as section 51, are formed of a nonconductive material. The section 51 is a part of the circular area 11 of FIG. 3. It is to be understood that the circular areas 12' and 10' also have nonconductive sections thereof in accordance with the drawing of FIG. 3. A brush 50 connects a battery source 46 to the code wheel so that as the brushes 13', 14', and 15' pass over the conductive portions of the code wheel a current is supplied through the leads 47, 48, and 49 of the comparator.

In FIG. 5 there is shown a simplified block diagram of the comparator circuit which is capable of comparing three-bit binary digital characters. In the embodiment of the invention shown in FIG. 1, it was assumed that the binary character employed to determine the position of the output shaft 19 was a 12-bit binary bit character. However, it is believed that the description and operation of a three-bit comparator will be sufficient to enable the reader to readily adapt its operation to a character employing any larger number of binary bits.

The comparator of FIG. 5 has the characteristic of providing an output signal on output lead 58 when coincidence between the input signal supplied from the digital character input source and the combined signals supplied from the code wheel and the counter coincide. Such output signal on the step motor run control lead 15" will cause the step motor of FIG. 1 to be energized. However, the direction of rotation of the step motor must also be determined. The signal determining such direction of rotation appears on the control lead 25".

The comparator also includes a full adder 52 and a NAND gate 57. The full adder is comprised of three stages labeled 1, 2, and 3 with the most significant bit of the binary character appearing in stage 3 and the least significant appearing in stage 1. The binary character from the digital character input source is supplied to the three stages of the full adder through input leads 63, 64, and 65. Also supplied to the three stages of the full adder is the three-bit binary digit detected from the code wheel and/or the counter which digit indicates the position of the shaft.

The block 59 of FIG. 5 functions to invert the binary character received from the code wheel and the counter and supplies such inverted binary digit to full adder 52. The inverted binary digit is, of course, the "1's" complement of the binary character received from the code wheel and the counter. The act of adding the "1's" complement to the signal supplied from the digital character input source 68 is the equivalent of subtracting the combined binary digit supplied by the code wheel and the counter from the binary digit received from the digital character input source 68. If coincidence exists, a "1" will appear on all the output leads 53, 54 and 55 of the full adder 52. Under these circumstances the signal appearing on output 15" of NAND gate 57 will cause the step motor to stop, i.e., become de-energized.

On the other hand, if coincidence does not exist between the signal received from the code wheel and the counter and that received from the input from the digital character source 68, then at least one of the three output leads 53, 54, and 55 of the full adder will be a zero and an output signal will appear on the output terminal 15" of NAND gate 57; which output signal will cause the step motor to be energized.

The direction of rotation of the step motor is controlled by the polarity of the signal on output lead 53 (also lead 25") of stage 3 of the full adder 52. More specifically, the presence of a "1" or a "0" on output lead 53 will cause the step motor to rotate in a counterclockwise or a clockwise direction, respectively. The logic determining the direction of rotation can best be understood by some specific examples and a truth table which will be included later herein.

For purposes of discussion, assume a shaft which has eight discrete positions, as shown in FIGS. 6a through 6d. The three-bit binary code of FIG. 5 will accommodate eight discrete angular positions of a shaft since $2^3=8$.

Basically, what is done to determine the minor arc direction of rotation from an old position to a new position is to first label each position with a number (binary digit) in consecutive order. Then the binary digit representing the old position is subtracted from the binary digit representing the new position. The answer to such subtraction can fall into any one of four possible categories. These categories are as follows:

(1) A positive difference where the absolute value is less than one-half the possible positions on the shaft. In the case where there are eight positions, the absolute value would have to be less than four for this category.

(2) A negative difference where the absolute value is less than four.

(3) A positive difference where the absolute value is greater than four.

(4) A negative difference where the asbolute value is greater than 4.

The four cases listed above are shown specifically in FIGS. 6a through 6d. For example, in FIG. 6a the old position is shown in the digram as being at 3 by the arrow 60. The new position to which the shaft is to be rotated is designated by the arrow 61 and in position 5. At the right in FIG. 6a is the computation employed in the comparator to determine the direction of rotation. The old position, represented by the binary character 011, is first inverted to form its complement, which is the binary character 100. Such complement is then added to the new position 5, designated by the binary character 101, to produce a sum represented by the binary character .011, which is equal to 3. The direction of rotation is determined by the nature of the most significant binary bit of the subtractor output. Since this bit is a "0," the rotation must be clockwise. Thus, the shortest angular path (minor arc path) from the old position to the position is in a clockwise direction.

In FIG. 6b there is shown the reverse situation of FIG. 6a. In FIG. 6b the old position is at 5 and the new position is 3. Subtracting the old position from the new position by the "ones" complement method gives a subtractor output of 101. Since the most significant bit of the subtractor output is a "1," the shortest angular path from the old position to the new position is in a counterclockwise direction, as indicated in FIG. 6b.

By similar processes, cases 3 and 4 (shown as FIGS. 6c and 6d) are computed. In FIG. 6c, for example, where the difference is positive and the absolute value is greater than 4, a counterclockwise rotation is called for. Such counterclockwise rotation is indicated by the presence of a "1" in the most significant bit of a subtractor output. In FIG. 6b, the most significant bit of the subtractor output is a "0" which calls for a clockwise rotation of the shaft in order to assume its new position in the shortest angular path.

It is to be understood that the forms of the invention shown and described herein are but preferred embodiments thereof and that various changes may be made in circuit design and in the arrangement thereof without departing from the spirit or the scope of the invention.

We claim:

1. Digital-to-analog converting means comprising:
   step motor means having an output shaft;

motor control means for causing said step motor means to step when energized;

code wheel means responsive to coarse positions of said output shaft to produce first coded output signals indicative of said coarse positions;

counter means responsive to output signals from said motor control means to produce second coded output signals indicative of fine positions of said output shaft;

the said first and second coded output signals together forming the most significant bits and the least significant bits, respectively, of a complete coded output signal representative of the precise position of said output shaft;

input means for supplying third coded signals indicative of an angular position to which said output shaft is to move;

comparator means responsive to said first and second coded signals and to said third coded signal to produce a first control signal;

said motor control means responsive to said control signal to cause said step motor means to step until a predetermined relation occurs between said first and second coded output signals and said third coded signal.

2. Digital-to-analog converting means in accordance with claim 1 in which:

said step motor means is constructed to step in either angular direction;

said counter means is constructed to count either forwards or backwards;

said comparator means is constructed to produce a second control signal to cause said step motor means to rotate in a particular angular direction;

and in which said motor control means is constructed to respond to said second control signal to supply third control signals to cause said step motor means to step selectively in either angular direction.

3. Digital-to-analog converting means in accordance with claim 2 comprising:

pulse generating means;

gating means;

said gating means responsive to said first control signal from said comparator means to supply output pulses from said pulse generating means to said motor control means;

said motor control responsive to said output pulses and the second control signal from said comparator mean to produce and supply second output pulses to said step motor means to cause said step motor means to step in an angular direction in accordance with the nature of said second control signal.

4. Digital-to-analog converting means in accordance with claim 3 in which said first, second, and third coded signals are in binary form and in which said comparator means comprises:

logic means comprising full adder means constructed to add together the 1's complement of said first and second coded output signals to said third coded signal;

gating means responsive to noncoincidence of said first and second coded signals with said third coded signal to produce said first control signal;

and means for detecting the state of the stage of said full adder containing the most significant binary bit to produce said second control signal.

5. Digital-to-analog converting means in accordance with claim 1 comprising:

pulse generating means;

gating means;

said gating means responsive to said first control signal from said comparator means to supply output pulses from said pulse generating means to said motor control means;

said motor control responsive to said output pulses to produce and supply second output pulses to said step motor means to cause said step motor means to step angularly.

6. Digital-to-analog converting means in accordance with claim 5 in which said first, second, and third coded signals are in binary form and in which said comparator means comprises:

logic means comprising full adder means constructed to add together the 1's complement of said first and second coded output signals to said third coded signal;

gating means responsive to noncoincidence of said first and second coded signals with said third coded signal to produce said first control signal;

means for detecting the state of the stage of said full adder containing the most significant binary bit to produce a second control signal;

said motor control means being responsive to said second control signal to determine the direction of rotation of said motor means.

7. Digital-to-analog converting means comprising:

step motor means having an output shaft;

energizing means constructed, when energized, to cause said step motor to step;

shaft position indicating means including mechanical means coupled to said output shaft and counting means responsive to output signals from said energizing means for producing first coded signals indicative of the angular position of said output shaft;

input means for supplying second coded signals indicative of the new angular position to which said output shaft is to be rotated;

comparator means responsive to said first and second coded signals to produce a first control signal to cause energization of said energizing means.

8. Digital-to-analog converting means in accordance with claim 7 in which:

said step motor means is constructed to step in either angular direction;

said counting means is constructed to count either forwards or backwards;

said energizing means is constructed to supply control signals to cause said step motor means to step in either angular direction;

and in which said comparator means is constructed to produce a second control signal indicative of the direction of rotation of said step motor means to said new angular position through the minor arc path.

9. Digital-to-analog converting means in accordance with claim 8 in which:

said energizing means comprises pulse generating means, motor control means, and gating means;

said gating means responsive to said first control signal from said comparator means to supply first output pulses from said pulse generating means to said motor control means; and said motor control responsive to said first output pulses and the second control signal from said comparator means to produce and supply second output pulses to said step motor means to cause said step motor means to step in an angular direction in accordance with the nature of said second control signal.

10. Digital-to-analog converting means in accordance with claim 9 in which said first and second signals are in binary form and in which said comparator comprises:

logic means comprising full adder means constructed to add together the 1's complement of said first coded signal to said second coded signal;

gating means responsive to noncoincidence of said first coded signals with said second coded signal to produce said first control signal;

and means for detecting the state of the stage of said full adder containing the most significant binary bit to produce said second control signal.

11. Digital-to-analog converting means in accordance with claim 7 in which:
said energizing means comprises pulse generating means, motor control means, and first gating means;
said first gating means responsive to said first control signal from said comparator means to supply first output pulses from said pulse generating means to said motor control means;
said motor control responsive to said output pulses to cause said step motor means to step.

12. Digital-to-analog converting means in accordance with claim 11 in which said first and second coded signals are in binary form and in which said comparator comprises:
means for comparing the individual bits of corresponding magnitude of said first and second coded signals to determine noncoincidence of said first and second coded signals;
second gating means responsive to noncoincidence of said first and second coded signals to produce said first control signal.

References Cited

UNITED STATES PATENTS

| | | | |
|---|---|---|---|
| 2,785,353 | 3/1957 | Fenemore | 318—28 |
| 2,867,724 | 1/1959 | Olson | 250—27 |
| 2,907,937 | 10/1959 | Apgar et al. | 318—28 |
| 3,036,292 | 5/1962 | Beall | 340—172.5 |
| 3,099,777 | 7/1963 | Davis | 318—28 |
| 3,245,073 | 4/1966 | Strunk et al. | 340—347 |

MAYNARD R. WILBUR, *Primary Examiner.*

W. J. KOPACZ, *Assistant Examiner.*